United States Patent [19]
Larson et al.

[11] 3,871,606
[45] Mar. 18, 1975

[54] INSTRUMENT MOUNT

[75] Inventors: Martin E. Larson, Kenosha, Wis.; Irvin M. White, Rio, Ill.

[73] Assignee: Outboard Marine Corporation, Waukegan, Ill.

[22] Filed: Mar. 21, 1973

[21] Appl. No.: 343,375

[52] U.S. Cl. .................................................. 248/27
[51] Int. Cl. ............................................. G12b 9/04
[58] Field of Search .............. 248/27; 339/126, 129; 180/90; 220/3.3, 3.5, 3.6; 24/263 PJ; 85/4

[56] References Cited
UNITED STATES PATENTS

| | | | |
|---|---|---|---|
| 1,284,890 | 11/1918 | Greenleaf | 248/27 |
| 1,497,922 | 6/1924 | Lux | 248/27 |
| 2,745,275 | 5/1956 | Jacobi | 248/27 X |
| 3,120,971 | 2/1964 | Bengtsson | 85/DIG. 2 X |
| 3,232,566 | 2/1966 | Eisenberg | 248/27 |
| 3,279,728 | 10/1966 | Campbell | 248/27 |
| 3,337,076 | 8/1967 | Ast | 248/27 X |
| 3,389,884 | 6/1968 | Ault | 248/27 X |
| 3,570,108 | 3/1971 | Sarra | 248/27 X |
| 3,599,910 | 8/1971 | Wipff | 248/27 |
| 3,662,085 | 5/1972 | Robinson et al. | 248/27 X |
| 3,666,040 | 5/1972 | Junk | 248/27 X |

Primary Examiner—Roy D. Frazier
Assistant Examiner—Thomas J. Holko
Attorney, Agent, or Firm—Michael, Best & Friedrich

[57] ABSTRACT

Disclosed herein is an instrument mounting including a housing comprising a tubular portion extending through a dashboard opening and radially outwardly extending means for engaging the front of the dashboard adjacent the margin of the dashboard around the opening to limit housing movement relative to the dashboard in the direction from the front to the rear, a retainer member adapted to engage the rear of the dashboard and including means selectively engageable with cooperating means on the exterior of the housing for permitting retainer movement forwardly relative to the housing and for preventing retainer movement rearwardly relative to the housing and thereby to prevent housing movement relative to the dashboard in the direction from the rear to the front, an instrument received in the tubular housing portion, abutment means extending inwardly of the housing for engagement with the instrument to limit forward instrument insertion in the housing, and means extending from the housing rearwardly of the abutment, and being movably resiliently biased toward a position inwardly of the housing for engagement with the instrument to limit rearward instrument withdrawal from the housing.

6 Claims, 2 Drawing Figures

3,871,606

3,871,606

INSTRUMENT MOUNT

BACKGROUND OF THE INVENTION

The invention relates generally to installing pre-wired instruments on a dashboard. One prior instrument installation arrangement is disclosed in the U.S. Pat. No. 3,570,108 issued Mar. 16, 1971. The arrangement disclosed therein requires, during installation, use of a screwdriver to adjust several biasing screws in the usually crowded and relatively inaccessible area behind the dashboard.

SUMMARY OF THE INVENTION

In accordance with the invention, there is provided an instrument mounting arrangement including a housing including a tubular portion extending through a dashboard opening and adapted to receive a pre-wired instrument, together with means on the housing for engaging the front of the dashboard adjacent the dashboard margin around the opening to limit housing movement relative to the dashboard in the direction from the front to the rear, together with a housing retainer or holding member adapted to engage the rear of the dashboard, and selectively engageable means on the housing retainer and on the housing for preventing housing movement relative to the dashboard in the direction from the rear to the front. In addition, there is also provided means independent of the housing retainer and extending inwardly of the housing for engagement with the instrument to limit forward instrument insertion and resilient means independent of the housing retainer and extending inwardly of the housing for engagement with the instrument to limit rearward instrument withdrawal from the housing. This insertion and retention can be obtained without the use of a tool.

More particularly, the means for limiting insertion and withdrawal of the instrument from the housing are adapted to engage a forwardly facing portion and a rearwardly facing portion on the instrument, and includes a rearwardly facing abutment means extending inwardly of the housing for engagement with the forwardly facing instrument portion to limit forward instrument insertion in the housing, together with resilient means extending from the housing rearwardly of the abutment means and biased toward a position inwardly of the housing for engagement with the rearwardly facing instrument portion to limit rearward instrument withdrawal from the housing. Such means is movable outwardly from the biased position upon forward instrument insertion.

In addition, means are provided for affording predetermined angular orientation between the instrument and the dashboard and for preventing relative angular movement between the instrument and the dashboard.

Still further in addition, such instrument orientation and angular movement preventing means includes means on the housing and on the dashboard and means on the housing and on the instrument for affording predetermined angular orientation therebetween and for preventing relative angular movement therebetween consequent to respective insertion of the housing into the dashboard and of the instrument into the housing.

Further in accordance with the invention, there is provided a method of mounting an instrument to a dashboard having an opening therein comprising inserting an instrument housing through the dashboard opening from the front toward the rear and engaging the housing with the front of the dashboard to limit rearward housing movement relative to the dashboard, followed by moving a retainer telescopically of the housing and forwardly from the rear of the housing and into engagement with the rear of the dashboard to limit further forward movement and simultaneously moving the retainer into engagement with the housing to limit rearward retainer movement relative to the housing and thereby prevent movement of the housing relative to the dashboard in the direction between the front and the rear of the housing. In addition, the method involves forwardly inserting the instrument into the open rearward end of the housing and engaging a forwardly facing portion of the instrument with the housing to limit forward instrument insertion into the housing and preventing rearward withdrawal of the instrument from the housing by engaging ears extending resiliently from the housing with a rearwardly facing portion of the instrument.

One of the principal objects of the invention is the provision of an instrument mounting in which separate means are employed for retaining an instrument housing on a dashboard and for retaining an instrument in the instrument housing.

Another of the principal objects of the invention is the provision of a dashboard instrument mounting arrangement which eliminates usage of any tools and which can be readily installed by inserting the housing from the front through a dashboard hole and by inserting the instrument into the housing from the rear of the dashboard.

Another principal object of the invention is the provision of a dashboard instrument mounting arrangement including means affording and maintaining proper angular orientation between an instrument housing and the dashboard and further means affording and retaining proper angular orientation between the housing and the instrument received in the housing.

Still another principal object of the invention is the provision of angular orientation affording means operable consequent to insertion of the housing into the dashboard and consequent to insertion of the instrument into the housing.

Another of the principal objects of the invention is the provision of a dashboard instrument housing arrangement wherein the instrument is inserted into the housing merely by pressure applied to the instrument and in which the instrument is thereafter held in the housing by resilient elements extending from the housing and engaging the instrument.

Still another of the principal objects of the invention is the provision of a method of readily installing a pre-wired instrument to a dashboard.

Other objects and advantages of the invention will become known by reference to the following description, claims, and accompanying drawings.

THE DRAWINGS

Figure 1:
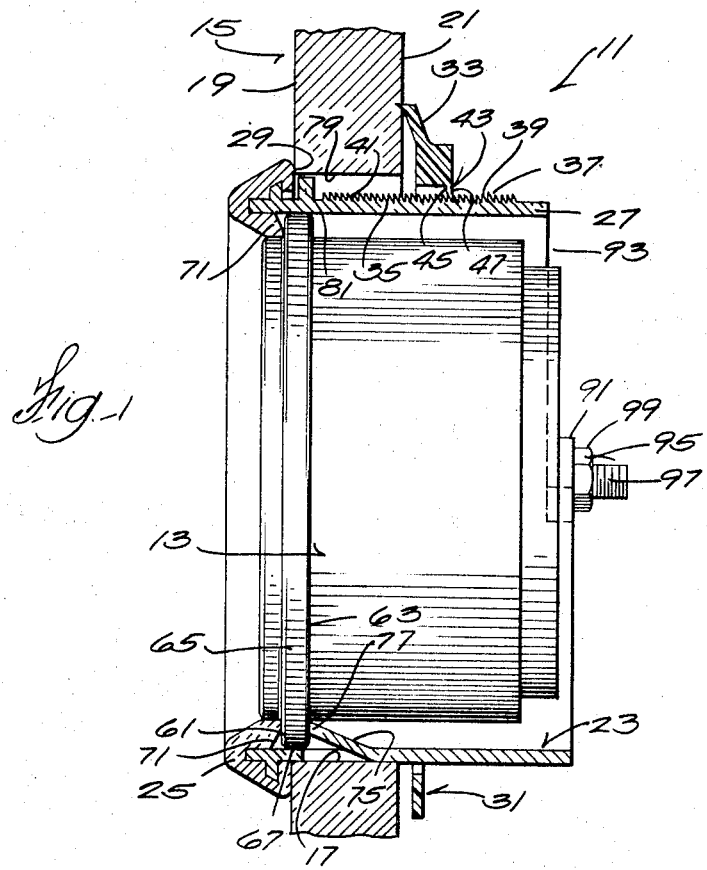
FIG. 1 is a side elevational view, partially broken away and in section, of a dashboard instrument mounting arrangement embodying various of the features of the invention.
Figure 2:
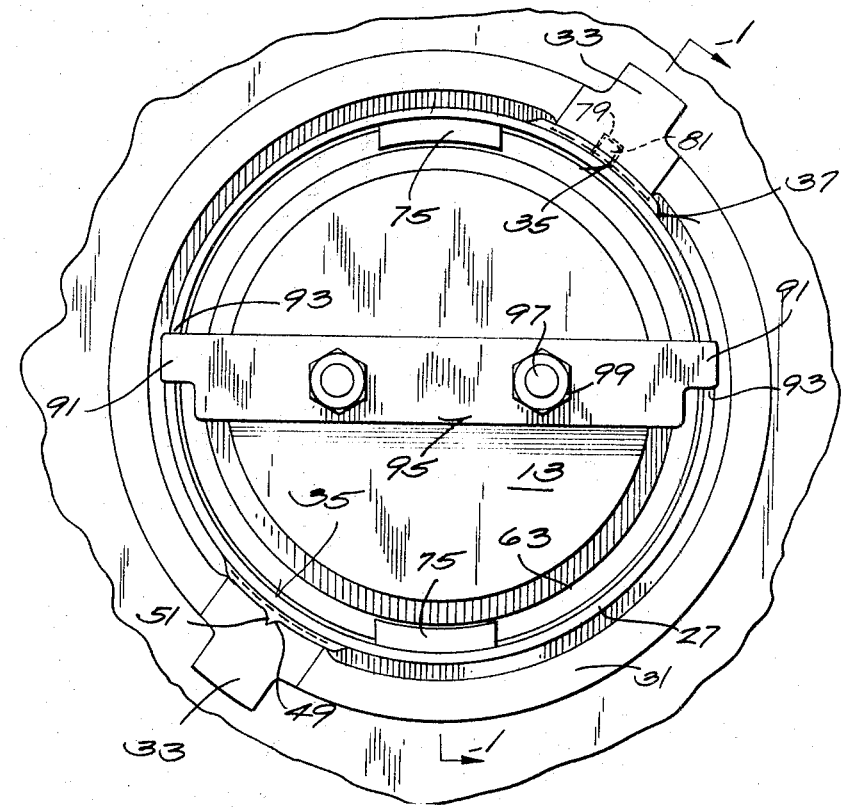
FIG. 2 is a rear view of the instrument mounting arrangement shown in FIG. 1.

Before explaining the invention in detail, it is to be understood that the invention is not limited in its application to the details of construction and arrangement of parts set forth in the following general description or illustrated in the accompanying drawings, since the invention is capable of other embodiments and of being practiced or carried out in various ways. Also it is to be understood that the phraseology or terminology employed herein is for the purpose of description and not of limitation.

GENERAL DESCRIPTION

Shown in the drawings in an arrangement 11 for mounting a pre-wired instrument 13 to a dashboard 15 having an opening or hole 17 extending therethrough between a front face 19 and a rear face 21. The mounting arrangement 11 includes an instrument housing 23 which can be integrally constructed and which, in the illustrated construction, is provided by suitable assembly of a bezel 25 to the front of an instrument case which constitutes a tubular housing portion 27 which is inserted in the dashboard opening 17 in the direction from the front to the rear.

Formed on the front of the instrument housing 23 is means in the form of the rearwardly facing surface 29 extending radially outwardly from the tubular housing portion 27 for engagement with the margin of the dashboard 15 around the opening 17 to limit rearward insertion of the instrument housing 23 into the dashboard opening 17. Various arrangements can be employed and, in the illustrated construction, the surface 29 is formed at the rear of the bezel 25.

Means are also provided for limiting or preventing instrument housing movement relative to the dashboard 15 in the direction from the rear to the front. While various other specific arrangements could be employed, in the illustrated construction such means comprises an annular retainer or ring 31 which is telescopically receivable on or movable relative to the tubular housing portion 27 and which is adapted to engage the rear 21 of the dashboard 15, together with selectively engageable means on the retainer 31 and on the instrument housing 27 for permitting retainer movement forwardly relative to the instrument housing 23 and for preventing retainer movement rearwardly relative to the instrument housing 23, and thereby to limit housing movement relative to the dashboard 15 from the rear to the front.

More specifically, as shown, the retainer ring 31 includes two diametrically opposed ears or tangs 33 which are inclined radially outwardly and in the forward direction and which can be pointed so as to provide a tight engagement with the rear face 21 of the dashboard 15.

Various arrangements can be employed to provide selectively engageable means on the retainer 31 and on the housing 23 for preventing housing movement relative to the dashboard 15 in the direction from the rear to the front. For instance, a bayonet type lock which is adjustably engageable in the direction between the front and rear of the dashboard 15 could be employed. In the illustrated construction, the selectively engageable means is operable to permit retainer movement forwardly relative to the instrument housing 23 and to prevent retainer movement rearwardly relative to the instrument housing 23. More specifically, the tubular housing portion 27 includes, on the exterior surface thereof, two diametrically spaced series 35 of axially spaced, partially circumferentially extending serrations 37 which include forwardly facing surfaces 39 extending normal or perpendicularly to the tubular housing portion 27 and rearwardly facing inclined surfaces 41. In addition, the inner bore of the retainer is provided with a pair of diametrically opposed and arcuately extending teeth or locking pawls 43 each having a forwardly facing inclined surface 45 and a rearwardly facing surface 47 extending normal or perpendicular to the tubular housing portion 27.

The retainer 31 is constructed of sufficiently resilient material so that, upon retainer movement forwardly of the instrument housing 23, the inclined surfaces 41 and 45 ride over one another due to the resiliency of the teeth 43, while rearward retainer movement relative to the instrument housing 23 is prevented by an abutting engagement of the normally extending surfaces 39 and 47. Consequently, the retainer 31 can be telescopically displaced forwardly along the instrument housing 23 until engaged with the rear face 21 of the dashboard 15. Thereafter, rearward retainer movement relative to the instrument housing 23 is prevented in the absence of such rotary movement between the retainer 31 and and the instrument housing 23 as will disengage the teeth 43 from the serrations 37. Prevention of rearward retainer movement relative to the instrument housing 23 prevents forward movement of the instrument housing 23 relative to the dashboard 15 to thereby maintain the instrument housing 23 in a fixed relation to the dashboard.

In order to assist in angularly locating the retainer teeth 43 in angular alignment with the serrations 37 on the instrument housing 23, one of the series of serrations 37 includes a radially outwardly projecting rib 49 extending in the direction between the front and the rear, and one of the retainer teeth 43 includes a mating groove 51. When the rib 49 and the groove 51 are in angular alignment, the full angular width of the teeth 43 is in engagement with the serrations 37 for maximum holding power against rearward retainer movement relative to the instrument housing 23. The tubular housing portion 27 is constructed of material which is sufficiently resilient so that the rib 49 is sufficiently resiliently deformable to permit angular movement of the retainer 31 relative to the instrument housing 23, while nonetheless affording ample rigidity to afford the already mentioned angular guidance between the tubular housing portion 27 and the retainer 31 during forward retainer movement relative to the instrument housing 23.

As already indicated, the instrument housing 23 is adapted to receive an instrument 13 which is preferably pre-wired and which can be inserted into the housing 23 from the open rear of the tubular housing portion 27

In further accordance with the invention, there is provided means independent of the housing retainer 31 and extending inwardly of the instrument housing 23 for engagement with the instrument 13 to limit forward instrument insertion from the rear and to limit rearward instrument withdrawal from the housing.

While various arrangements could be employed, in the illustrated construction, the instrument 13 is provided with a forwardly facing portion 61 and a rearwardly facing portion 63. In the disclosed constructions, such portions 61 and 63 are formed by the opposing surfaces of a radially outwardly extending and forwardly located flange 65 having an outer surface 67 which is slidably receivable in the tubular housing portion 27 so as to generally stabilize the instrument 13 within the housing 23. In addition, the instrument housing 23 includes a forwardly located and rearwardly facing abutment means 71 adapted to engage the forward facing portion 61 of the instrument 13 to limit forwardly instrument insertion. In the illustrated construction, such abutment means 71 comprises a surface formed at the rear of the bezel 25 adjacent to the forward end of the tubular housing portion 27.

In addition, there is provided means extending from the instrument housing 23 rearwardly of the abutment means 71 and resiliently biased toward a portion inwardly of the instrument housing 23 for engageament with the rearwardly facing instrument portion 63 to limit rearward instrument withdrawal. Such means comprises resilient ears or tangs 75 which are formed out of the material of the tubular housing portion 27 and which are temporarily movable radially outwardly from their inward position during forward instrument insertion from the rear. More specifically, a pair of diametrically located ears or tangs 75 with forwardly located edges 77 are employed.

Also provided in accordance with the invention are means for affording predetermined angular orientation between the instrument 13 and the dashboard 15 and for preventing relative angular movement therebetween. In further accordance with the invention, such means includes means on the instrument housing 23 and on the dashboard 15 and means on the instrument housing 23 and the instrument 13 for affording predetermined angular orientation therebetween and for preventing relative angular movement therebetween.

While other constructions are possible, the means for angularly aligning the housing 23 relative to the dashboard 15 and for preventing angular relative movement therebetween comprises, in the illustrated construction, formation of a radially outwardly projecting slot 79 extending from the dashboard opening 17 and inclusion on the tubular housing portion 27 of a radially outwardly extending protuberance 81 receivable in the slot 79 to afford angular orientation and to prevent angular movement between the housing 23 and the dashboard 15 consequent to engagement of the bezel surface 29 against the front face 19 of the dashboard 15.

While various other arrangements could be employed, the means for affording angular orientation between the instrument 13 and the housing 23 and preventing relative angular movement therebetween comprises, in the illustrated construction, inclusion on the instrument of one or more radially outwardly extending wings or ears 91 which are adapted to be received in one or more slots 93 in the rearward edge of the housing 23 consequent to full insertion of the instrument 13 into the housing 23. More specifically, in the disclosed construction, there is provided a strap 95 which is attached as by studs 97 and nuts 99 or otherwise to the instrument 13 prior to insertion and which includes diametrically opposed ends which provide the beforementioned ears 91. In addition, the rearward edge of the tubular housing portion 27 is relieved or notched through an angle of about 180 degrees so as to provide a step 93 affording receipt of the strap ends or wings 91 when the instrument 13 is in proper angular orientation to the housing 23. Such receipt also prevents angular movement between the housing 23 and the instrument 13.

While the disclosed tubular housing portion 27 is generally cylindrical in shape, other non-cylindrical shapes could be employed while still obtaining various of the features of the invention. Thus, if the tubular housing were non-cylindrical shape, the retaining ring could be similarly designed so as to afford telescopic receipt in the housing while simultaneously affording proper angular orientation therebetween and prevention of angular movement therebetween.

Various of the features of the invention are set forth in the following claims.

What is claimed is:

1. An instrument mounting for a dashboard having an opening therein, said mounting comprising a housing including a tubular portion extending through the dashboard opening, means on said margin of the dashboard around the opening to limit housing movement relative to the dashboard in the direction from the front to the rear, a housing retainer member adapted to engage the rear of the dashboard, selectively engageable means on said housing retainer and on said housing for preventing housing movement relative to the dashboard in the direction from the rear to the front, an instrument received in said tubular housing portion, means extending inwardly of said housing for engagement with said instrument to limit forward instrument insertion and to limit rearward instrument withdrawal from said housing, and cooperating means on said instrument and on said housing and on the dashboard for affording predetermined angular orientation of said instrument relative to the dashboard and for preventing relative angular movement of said instrument relative to the dashboard, said cooperating means including a step in the rear edge of said housing and a wing extending radially from said instrument and located in said step in response to instrument insertion into said housing so as thereby to afford predetermined angular orientation between said instrument and said housing and to prevent relative angular movement therebetween.

2. An instrument mounting in accordance with claim 1 wherein said cooperating means includes a projection on said housing adapted to be received in a slot extending from the dashboard opening so as thereby to afford predetermined angular orientation between said housing and the dashboard and to prevent relative angular movement therebetween.

3. An instrument mounting in accordance with claim 1 wherein said retainer is annular.

4. An instrument mounting for a dashboard having an opening therein, said mounting comprising a housing including a tubular portion extending through the dashboard opening, a rearwardly facing surface extending radially outwardly from said housing and adapted to engage the front of the dashboard adjacent the margin of the dashboard around the opening to limit housing movement relative to the dashboard in the direction from the front to the rear, a retainer member adapted to engage the rear of the dashboard, selectively engageable means on said retainer and on said housing for permitting retainer movement forwardly relative to said housing and for preventing retainer movement rearwardly relative to said housing and thereby to limit housing movement relative to the dashboard in the direction from the rear to the front, an instrument received in said tubular housing portion and having a forwardly facing portion and a rearwardly facing portion, a rearwardly facing abutment means extending inwardly of said housing for engagement with said forwardly facing instrument portion to limit forward instrument insertion in said housing, means extending from said tubular housing portion rearwardly of said abutment means and being resiliently biased toward a position inwardly of said housing for engagement with said rearwardly facing instrument portion to limit rearward instrument withdrawal from said housing and being temporarily movable outwardly from said position upon forward instrument insertion into said housing from the rear and cooperating means on said instrument and on said housing and on the dashboard for affording predetermined angular orientation of said instrument relative to the dashboard and for preventing relative angular movement of said instrument relative to the dashboard, said cooperating means including a step in the rear edge of said housing and a wing extending radially from said instrument and located in said step in response to instrument insertion into said housing so as thereby to afford predetermined angular orientation between said instrument and said housing and to prevent relative angular movement therebetween.

5. An instrument mounting in accordance with claim 4 wherein said retainer is annular.

6. An instrument mounting in accordance with claim 4 wherein said cooperating means includes a projection on said housing adapted to be received in a slot extending from the dashboard opening so as thereby to afford predetermined angular orientation between said housing and the dashboard and to prevent relative angular movement therebetween.

* * * * *